UNITED STATES PATENT OFFICE.

BALZAR H. PULLIN, OF McDOWELL, VIRGINIA.

IMPROVEMENT IN MEDICINES OR POWDERS FOR TREATING CATTLE AND HOGS.

Specification forming part of Letters Patent No. 118,052, dated August 15, 1871.

*To all whom it may concern:*

Be it known that I, BALZAR H. PULLIN, of McDowell, Highland county, Virginia, have invented new and Improved Cattle and Hog-Powders for promoting the health and preventing diseases in cattle and hogs; and I do hereby declare the following ingredients, in the quantities hereafter set forth, to be the components of my celebrated cattle and hog-powders: One ounce of camphor, two ounces of asafetida, one ounce pulverized cloves, one ounce garlic, one-half ounce of niter, two ounces of sulphur, one ounce of magnesia, one ounce of Harlaem oil, fifteen drops of croton oil; to each pound of the above ingredients, one ounce of charcoal and one ounce of ashes; the whole to be thoroughly mixed and compounded together, the compound to be administered to cattle or hogs, from one to six ounces.

What I claim as my invention, and desire to secure by Letters Patent, is—

The recipe or composition of the ingredients above named, in the quantities substantially as and for the purposes above set forth.

B. H. PULLIN.

Witnesses:
S. H. MOFFETT,
GEORGE J. KISLING.